United States Patent [19]
Hammel et al.

[11] Patent Number: 6,121,337
[45] Date of Patent: *Sep. 19, 2000

[54] COMPOSITIONS CONTAINING 1,1,2,2-TETRAFLUOROETHANE (HFC-134) FOR CLOSED-CELL POLYMER FOAM PRODUCTION

[75] Inventors: Howard Sims Hammel, Bear; Joseph Anthony Creazzo, Wilmington, both of Del.

[73] Assignee: E. I. du Pont de Nemours and Company, Wilmington, Del.

[ * ] Notice: This patent is subject to a terminal disclaimer.

[21] Appl. No.: 08/898,980

[22] Filed: Jul. 23, 1997

Related U.S. Application Data

[63] Continuation-in-part of application No. 08/627,520, Apr. 4, 1996, which is a continuation of application No. 08/427,643, Apr. 24, 1995, Pat. No. 5,516,811, which is a continuation of application No. 07/973,599, Nov. 9, 1992, Pat. No. 5,439,947, which is a continuation of application No. 07/702,282, Jun. 28, 1991, abandoned, which is a continuation of application No. 07/577,045, Aug. 28, 1990, abandoned, which is a continuation of application No. 07/500,051, Mar. 23, 1990, abandoned

[60] Provisional application No. 60/022,574, Jul. 24, 1996.

[51] Int. Cl.$^7$ ........................................................ C08J 9/14
[52] U.S. Cl. ........................ 521/131; 521/137; 521/155; 521/170; 521/172; 521/174
[58] Field of Search ...................................... 521/131, 137, 521/155, 170, 172, 174

[56] References Cited

U.S. PATENT DOCUMENTS

| | | |
|---|---|---|
| 4,101,467 | 7/1978 | Park et al. . |
| 4,945,119 | 7/1990 | Smits et al. . |
| 4,972,003 | 11/1990 | Grünbauer et al. . |
| 5,134,171 | 7/1992 | Hammel et al. . |
| 5,145,606 | 9/1992 | Omure et al. . |
| 5,147,896 | 9/1992 | York . |
| 5,182,040 | 1/1993 | Bartlett et al. . |
| 5,185,094 | 2/1993 | Shiflett . |
| 5,204,169 | 4/1993 | York . |
| 5,244,928 | 9/1993 | Smith et al. . |
| 5,278,196 | 1/1994 | Robin et al. . |
| 5,286,757 | 2/1994 | Smith et al. . |
| 5,290,466 | 3/1994 | Shiflett . |
| 5,314,926 | 5/1994 | Robin et al. . |
| 5,334,337 | 8/1994 | Voelker et al. . |
| 5,516,811 | 5/1996 | Bartlett . |
| 5,532,284 | 7/1996 | Bartlett et al. . |

FOREIGN PATENT DOCUMENTS

| | | |
|---|---|---|
| 1086450 | 9/1982 | Canada . |
| 406206 | 1/1991 | European Pat. Off. . |
| 483573 | 5/1992 | European Pat. Off. . |
| 2734307 | 9/1986 | Germany . |
| 05230265 | 2/1992 | Japan . |
| 5-287111 | 11/1993 | Japan . |
| 157801 | 6/1994 | Japan . |
| 1541964 | 3/1979 | United Kingdom . |

Primary Examiner—John M. Cooney, Jr.
Attorney, Agent, or Firm—J. E. Shipley

[57] ABSTRACT

An improved closed cell polymer foam and foaming agent involving the use of a hydrogen-containing halocarbon blowing agent (e.g., HCFC-22) in combination with an effective amount of a hydrogen bond forming blocking agent (e.g., organic ether, ester or ketone). The presence of the blocking agent is shown to significantly reduce the escape of blowing agent from and entry of air into the foam resulting in low thermal conductivity over a longer period of time and improved thermal insulation value. The present invention further relates to compositions comprising a blowing agent and an active hydrogen-containing compound, commonly referred to in the art as B-side compositions or blends, and using such compositions for producing polyurethane and polyisocyanurate foams in which the blowing agent comprises a major proportion of 1,1,2,2-tetrafluoroethane (HFC-134).

8 Claims, 1 Drawing Sheet

COMPOSITIONS CONTAINING 1,1,2,2-TETRAFLUOROETHANE (HFC-134) FOR CLOSED-CELL POLYMER FOAM PRODUCTION

CROSS REFERENCE TO RELATED APPLICATIONS

This application claims the priority benefit of U.S. Provisional Application 60/022,574, filed Jul. 24, 1996. Also, this application is a continuation-in-part of in-prosecution U.S. application Ser. No. 08/627,520, filed Apr. 4, 1996, which is a continuation of U.S. application Ser. No. 08/427,643, filed Apr. 24, 1995, now U.S. Pat. No. 5,516,811, which is a continuation of U.S. application Ser. No. 07/973,599, filed Nov. 9, 1992, now U.S. Pat. No. 5,439,947, which is a continuation of abandoned U.S. application Ser. No. 07/702,282, filed Jun. 28, 1991, which is a continuation of abandoned U.S. application Ser. No. 07/577,045, filed Aug. 28, 1990, which is a continuation of abandoned U.S. application Ser. No. 07/500,051, filed Mar. 23, 1990.

The subject matter of the present application is also related to copending U.S. application Ser. No. 08/898,979, now U.S. Pat. No. 5,912,279, filed on even date herewith in the names of Creazzo and Hammel (attorney docket number CH-1600G).

The disclosure of the patents and patent applications are hereby incorporated by reference.

FIELD OF THE INVENTION

This invention relates to improved polymer foams and foaming agents by the use of blocking agents. More specifically, the invention relates to combinations of a hydrogen bond forming blocking agent and a hydrogen-containing halocarbon and a method of using the same in closed cell polymer foams to reduce permeation of air and/or hydrohalocarbon, thereby maintaining low thermal conductivity and improved thermal insulation value of the foam. The present invention further relates to compositions comprising a blowing agent and an active hydrogen-containing compound, commonly referred to in the art as B-side compositions or blends, and using such compositions for producing polyurethane and polyisocyanurate foams in which the blowing agent comprises a major proportion of 1,1,2,2-tetrafluoroethane (HFC-134).

BACKGROUND OF THE INVENTION

It is generally known and an accepted commercial practice to add a blowing agent to various polymeric materials during fabrication such as to produce a cellular (expanded foam) material. Typically, the blowing agent can be either a reactive solid or liquid that evolves a gas, a liquid that vaporizes, or a compressed gas that expands during final fabrication producing the desired polymeric foam. Such foams are categorically either closed cell (i.e., non-porous, continuous polymer phase with discontinuous gas phase dispersed therein) or open cell (porous) foams which are advantageously employed in various end use applications and exhibit various advantages associated with the particular type of foam produced. In describing the closed cell foam as involving a discontinuous gas phase, it should be appreciated that this description is an over simplification. In reality the gas phase is dissolved in the polymer phase and there will be a finite substantial presence of gas (blowing agent) in the polymer. Furthermore and as generally known in the art, the cell gas composition of the foam at the moment of manufacture does not necessarily correspond to the equilibrium gas composition after aging or sustained use. Thus, the gas in a closed cell foam frequently exhibits compositional changes as the foam ages leading to such known phenomenon as increase in thermal conductivity or loss of insulation value.

Closed cell foams are usually employed for their reduced thermal conductivity or improved thermal insulation properties. Historically, insulating polyurethane and polyisocyanurate foams have been made using trichlorofluoromethane, $CCl_3F$ (CFC-11), as the blowing agent. Similarly, insulating phenolic foam is known to be made from phenol-formaldehyde resins (typically via an intermediate resole mixture involving a phenol-formaldehyde oligomer condensate) using blends of 1,1,2-trichlorotrifluoroethane, $CCl_2FCClF_2$ (CFC-113), and CFC-11 as the blowing agent. Also, insulating thermoplastic foam such as polystyrene foam is commonly manufactured using dichlorodifluoromethane, $CCl_2F_2$ (CFC-12), as the blowing agent.

The use of a chlorofluorocarbon as the preferred commercial expansion or blowing agent in insulating foam applications is in part based on the resulting k-factor (i.e., the rate of transfer of heat energy by conduction through one square foot of one inch thick homogenous material in one hour where there is a difference of one degree Fahrenheit perpendicularly across the two surfaces of the material) associated with the foam produced. Thus, it is generally known and accepted that a chlorofluorocarbon gaseous phase within the closed cell is a superior thermal barrier relative to other inexpensive gases such as air or carbon dioxide. Conversely, the natural intrusion of air into the foam over time and to a lesser extent the escape of the chlorofluorocarbon from the cell is deleterious to the desired low thermal conductivity and high insulative value of the foams. Also, the escape of certain chlorofluorocarbons to the atmosphere is now recognized as potentially contributing to the depletion of the stratospheric ozone layer and contributing to the global warming phenomenon. In view of the environmental concerns with respect to the presently used chlorofluorocarbon blowing agents, it is now generally accepted that it would be more desirable to use hydrochlorofluorocarbons or hydrofluorocarbons rather than the chlorofluorocarbons. Consequently, the need for a method or way of inhibiting the permeation of air and blowing agent through the polymer phase of the polymeric foam exists and hopefully any such solution to the problem would be effective in inhibiting the permeation of the proposed alternative halocarbons Historically, various methods and compositions have been proposed, with varying degree of success, to alleviate and/or control problems associated with permeation of gases into and out of polymeric foams. For example, in U.S. Pat. No. 4,663,361 the problem of shrinkage (lack of dimensional stability) associated with using any blowing agent other than 1,2-dichlorotetrafluoroethane in the manufacture of foamed polyethylene is addressed. In this reference, a stability control agent is used in either a homopolymer or copolymer of ethylene wherein the blowing agent is isobutane or isobutane mixed with another hydrocarbon or a chlorocarbon, fluorocarbon or chlorofluorocarbon. The stability control agent is either partial esters of long chain fatty acids with polyols, higher alkyl amines, fatty acid amides, olefinically unsaturated carboxylic acid copolymers, or polystyrene. This reference also describes other prior art and is included by reference for such purpose.

In U.S. Pat. No. 4,243,717 a Fischer-Tropsch wax is added to expanded polystyrene beads to produce a stable cell structure in the foam, without specific reference to the permeation of blowing agent or air. In Canadian Patent No. 990,900 the use of a barrier material or blocking agent is disclosed to alleviate the problem Or gas migration through the cell wall specifically at the time of foaming. The particular problem addressed in this Canadian patent is the rupture and total collapse of the cell walls that frequently occur in the manufacture of closed cell polyethylene foam. This problem is attributed to the fact that the cell walls for such foams are permeable to the rapidly expanding gas under the influence o the heat liberated by the exothermic polymer crystallization. The specific solution disclosed in this reference is to use a blend of polyethylene and polypropylene along with a barrier resin such as a elastomer containing polystyrene or acrylic resin which are intended to contribute high melt strength to the cell wall at the foaming temperature. An inert nucleant is also employed along with at least two gaseous propellants of substantially different vapor pressures.

In U.S. Pat. No. 4,795,763 the use of at least 2 percent carbon black as a filler uniformly dispersed in a polymeric foam is shown to reduce the aged k-factor of the foam to below the aged k-factor of the corresponding unfilled foam.

In U.S. Pat. No. 4,997,706, Smits et al. disclose rigid closed-cell polyisocyanate-based foams having reduced thermal insulation loss prepared by reaction of a polyisocyanate with an active hydrogen-containing compound in the presence of both (a) a $C_2$–$C_6$ polyfluorocarbon containing no Cl or Br atoms as blowing agent and (b) a blowing agent precursor, more specifically water, which provides $CO_2$ in situ, as co-blowing agent, through reaction with isocyanate groups of the polyisocyanate. The proportions of the polyfluorocarbon and the blowing agent precursor are such that the initial gas composition within the closed cells of the foam comprise from about 1 to 60 mole percent polyfluorocarbon and from about 40 to 99 mole percent $CO_2$.

In U.S. Pat. No. 4,972,003, Grunbauer et al. prepare rigid closed-cell polyisocyanate-based foams using gaseous blowing agents, broadly including HFC-134, HFC-134a and HFC-152a in conjunction with about 25–95 mole percent, based on the total moles of blowing agent, of a gas, e.g., $CO_2$, generated from a blowing agent precursor, e.g., water.

The Smits et al. and Grunbauer et al. foaming systems suffer in that they require large proportions of water as a blowing agent precursor. This is not only wasteful of isocyanate(—NCO) groups, which react with water to produce $CO_2$, but tends to lead to unsatisfactory foam, e.g, refer to U.S. Pat. Nos. 5,164,419 and 4,943,597.

SUMMARY OF THE INVENTION

The present invention provides a method of preventing or slowing down both the rate of intrusion or permeation of air into the closed cells of a polymeric foam as well as preventing or slowing down the escape of the blowing agent by permeation or migration out of the polymer foam cells. Thus, according to the present invention the effective rate of permeation of air and/or hydrohalocarbon across the polymeric phase of the foam is substantially reduced by virtue of the presence of a blocking agent. Further according to the present invention a blocking agent capable of hydrogen bond formation with the hydrogen-containing halocarbon is incorporated into the polymeric foam and thus tends to form hydrogen bonds with the blowing agent. This in turn dramatically reduces the permeation rate of the hydrogen-containing blowing agent retaining it in the foam. The presence of the blocking agent also functions to reduce entry of air into the polymer foam. By reducing the entry of air into insulating foam and simultaneously reducing the permeation of blowing agents out of insulating foam, the blocking agents according to the present invention produce foams which better maintain their insulating characteristics relative to foams made without these hydrogen bond forming agents. Thus, the present invention provides in a closed cell thermoplastic or thermoset polymer foam characterized by a continuous polymeric phase and a discontinuous gaseous phase, the improvement comprising: (a) a gaseous phase comprising at least one hydrogen-containing halocarbon; and (b) an effective amount of a hydrogen bond forming blocking agent. Preferably the hydrogen bond forming blocking agent is an organic ether, ester or ketone and is preferably present in the range of from about 0.1 to about 20 weight percent based on the total weight of foam. Since the blocking agent according to the present invention can often be conveniently incorporated, marketed and used in combination with the blowing agent, the present invention further provides an improved thermoplastic or thermoset polymer foaming composition comprising:

(a) a hydrogen-containing halocarbon; and
(b) an effective amount of a hydrogen bond forming blocking agent.

The improved method according to the present invention involves, in a method of manufacturing an expanded polymeric foam wherein a blowing agent expands as the polymeric phase solidifies, the specific improvement comprising the steps of:

(a) selecting a hydrogen-containing halocarbon as the blowing agent; and
(b) adding an effective amount a hydrogen bond forming blocking agent to reduce the permeation of air into the foam or slow down the escape of blowing agent from of the foam.

It is an object of the present invention to provide a blocking agent that when incorporated into a polymeric foam will reduce or prevent the intrusion of air into the foam and/or the permeation or escape of blowing agent from the foam. It is a further object of the present invention to provide such a blocking agent that is particularly useful with the hydrogen-containing chlorofluorocarbons and hydrogen-containing fluorocarbons (i.e., the HCFCs and HFCs) in that the blocking agent will hydrogen bond with the hydrohalomethanes and hydrohaloethanes, thus significantly reducing their rate of permeation and escape from a closed cell polymeric foam. It is an associated object of the present invention to provide insulating foam containing a blocking agent and a method of manufacturing the same that exhibits preservation of the insulating properties over longer periods of times relative to the absence of the blocking agent.

There is also a need in this field for compatible blends of low-boiling blowing agents and active hydrogen-containing compounds wherein the blowing agents exhibit high solubility in the active hydrogen-containing medium; yet, exerts vapor pressures over the resulting blends that are sufficiently low that the blends need not be unduly pressurized before and during reaction with a polyisocyanate reactant. In general, the higher the blowing agent concentration, the lower the density of the foam produced. Also, the lower the vapor pressure of the blowing agent, when in combination with the active hydrogen containing component, the less difficult it is to provide for both a homogeneous reaction mixture with the polyisocyanate and a uniform cellular structure of the resulting foam. A need exists, therefore, for effective blowing agents for polyisocyanate-based foams that are environmentally friendly, that is, have substantially zero ozone depletion potential (ODP); furthermore have no or very low global warming potential (GWP), i.e., make no significant contribution to the so-called greenhouse effect, and preferably are substantially nonflammable for added safety in use. The present invention solves these problems by providing an HFC-containing blowing agent comprising HFC-134.

The present instant invention further comprises a process for producing polyisocyanate-based foams, e.g., polyurethane and polyisocyanurate foams, including rigid closed-cell foams, which comprises effecting reaction of a polyisocyanate with an active hydrogen-containing compound bearing two or more active hydrogens, in the form of hydroxyl groups. The process comprises employing a B-side composition comprising (a) a normally liquid active hydrogen-containing component having two or more active hydrogens and dissolved therein, at an effective temperature and pressure, an effective blowing agent amount of, (b) an environmentally friendly normally gaseous polyfluorocarbon blowing agent devoid of halogen substituents other than fluorine and comprising a major proportion by weight of HFC-134, said B-side composition having a relatively low or no water content; such that the total water content corresponds to less than about 25 mole percent and the polyfluorocarbon blowing agent to more than about 75 mole percent of the combined water and polyfluorocarbon contents. Typically, the water content is less than about 15 mole percent, normally less than about 10 mole percent, still more desirably is substantially nil. Moreover, the polyfluorocarbon comprises at least about 70 weight percent, normally at least about 80 weight percent, still more desirably at least about 90 weight percent of HFC-134, including substantially 100 weight percent of this fluorocarbon. Normally, the blowing agent amount is about 5 to about 35, typically about 8 to about 30, and desirably about 10 to about 15 weight percent of the B-side composition consisting essentially of the blowing agent component and the active hydrogen-containing component. The present process can be practiced while in the presence of a polyfluorocarbon blowing agent as defined above in the substantial absence of water as defined above. In one such process embodiment, the polyfluorocarbon component is preblended with the active hydrogen-containing component to form a substantially water-free and homogeneous isocyanate-reactive solution. The preblend is subsequently contacted with the polyisocyanate in a mixing zone of a conventional mixhead to form a substantially water-free reaction mixture, which in turn is allowed to expand at suitable temperatures and pressures to the foamed state. Alternatively, the blowing agent composition can be added to the hydrogen-containing composition, in line to or separately at the mixhead and the subsequent isocyanate reactive solution introduced into the mixing zone by utilizing conventional mixing techniques known in this art, and the resulting foam mixture is allowed to expand.

By environmentally friendly polyfluorocarbon blowing agent composition comprising a major proportion of HFC-134 by weight, it is meant a blowing agent composition consisting essentially of HFC-134 alone or containing less than about 50, normally less than about 30, and still more desirably less than about 10 weight percent of other compatible polyfluorinated blowing agents that are devoid of halogen substituents other than fluorine, and are not classified as VOCs (volatile organic compounds). That is, the blowing agent composition has low or zero ozone depletion potential (ODP) and low halocarbon global warming potential (HGWP) or greenhouse effect.

Suitable polyfluorinated co-blowing agents have 1 to 2 carbon atoms, at least one hydrogen atom and two or more fluorine atoms. Examples of suitable co-blowing agents comprise at least one member selected from the group consisting of HFC-134a (1,1,1,2-tetrafluoroethane), HFC-152a (1,1-difluoroethane), HFC-143a (1,1,1-trifluoroethane), HFC-32 (difluoromethane), and HFC-125 (pentafluoroethane), among others. Especially useful blowing agent mixtures are those wherein the total number of fluorine atoms is equal to or exceeds the total number of hydrogen atoms so that the total composition is substantially nonflammable. Suitable blowing agent compositions include azeotrope-like or azeotropic mixtures of HFC-134 with said co-blowing agent or agents. For example, the flame resistant and nonflammable mixtures of HFC-134 with HFC-152a typically containing about 22 weight percent or less of HFC-152a, e.g., at least about 87 weight percent of HFC-134 and less than about 13 weight percent of HFC-152a.

By "nonflammable", it is meant to refer to such a determination made by test ASTM E 681-85 with modifications listed in draft form, November 1993, by ASTM committee E27 or by ASTM E918.

By "low HGWP" effect, it is meant to refer to a compound having a HGWP value of about 0.50 or less, preferably about 0.32 or less, more preferably about 0.30 or less as determined by the method described in D. A. Fisher et al, NATURE, 1990, 344, p. 513; hereby incorporated by reference.

The active hydrogen-containing compounds of this invention can comprise compounds having two or more groups that contain an active hydrogen atom reactive with an isocyanate group, such as described in U.S. Pat. No. 4,394,491; hereby incorporated by reference. While any suitable compound can be employed, examples of such compounds have at least two hydroxyl groups per molecule, and more specifically comprise polyols, such as polyether or polyester polyols because such compounds can solvate HFC-134 and other hydrogen-containing polyfluorocarbon blowing agents as well as for the reactivity of hydroxyl groups towards isocyanate groups. While any suitable polyol can be employed, examples of such polyols are those which have an equivalent weight of about 50 to about 700, normally of about 70 to about 300, more typically of about 90 to about 270, and carry at least 2 hydroxyl groups, usually 3 to 8 such groups.

Saturated vapor pressure refers to the vapor pressure exerted by a solution of the blowing agent in an active hydrogen-containing component that is defined within a closed space. Given that the blowing agent is normally gaseous and, therefore, a lower-boiling compound than the normally liquid active hydrogen-containing component, the observed saturated vapor pressure at the temperature employed is substantially that of the blowing agent. The saturated vapor pressure of such solutions accordingly corresponds to the reaction pressure that would be required to maintain the blowing agent in solution, 1) in the same active hydrogen-containing composition, 2) at the same concentration and temperature, 3) as a substantially homogeneous mass, either as an isocyanate-reactive composition or as a foam-forming reaction mass containing a suitable polyisocyanate.

A key aspect of the present invention is based upon the surprising discovery that HFC-134 is more highly soluble than its isomer HFC-134a in active hydrogen-containing compositions and that the resultant mixtures or solutions (B-side compositions) exert lower saturated vapor pressures than do comparable solutions of HFC-134a (and such other recommended blowing agent as HFC-152a over a wide range of temperatures and concentrations). Thus, preblends comprising practical concentrations of HFC-134-based blowing agents may be formulated, maintained, and used in reactions with polyisocyanates under relatively more moderate conditions of temperature and pressure, including ambient, than are required for the other blowing agents. HFC-134 may also be employed in the substantial absence of water as defined herein above. Thus, the higher solubilities and lower vapor pressures of HFC-134 in combination with the active hydrogen-containing substances makes more practical the formulation and use of B-side compositions containing HFC-134 for the production of polyisocyanate-based foams. This combination of properties also facilitates the process embodiments of bringing together and mixing the blowing agent, the active hydrogen-containing material and the polyisocyanate under foam-forming reaction conditions because lower operating pressures may be employed to produce desirably homogeneous reaction masses and resultant closed-cell foams.

Fulfillment of these objects and the presence and fulfillment of additional objects will be apparent upon complete reading of the specification and the claims.

DETAILED DESCRIPTION

Figure 1:
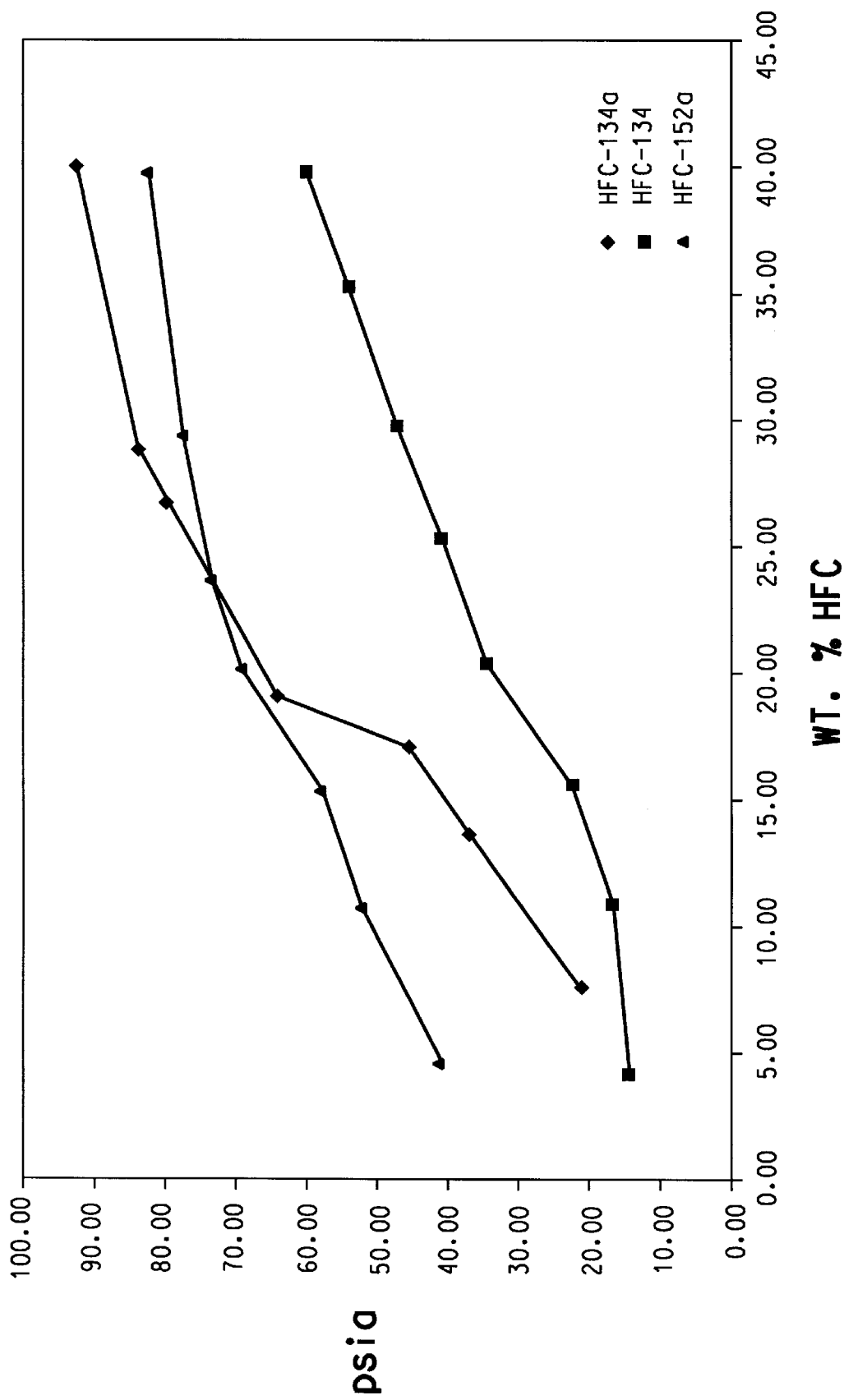
FIG. 1 is a plot of the vapor pressures exerted by HFC-134, HFC-134a and HFC-152a from solution in a representative isocyanate-reactive polyol.

Polymer foams typically involve a continuous or at least a contiguous phase in a cellular structure. This cellular structure can be either flexible or rigid and is categorically either an open cell structure (i.e., the individual cells are ruptured or open producing a soft, porous "sponge" foam which contains no blowing agent gas) or a closed cell structure (i.e., the individual cells contain blowing agent gas surrounded by polymeric sidewalls with minimum cell-to-cell gas flow). Thermally insulating foams are closed cell structures containing a blowing agent gas (i.e., a gas formed in situ during the foam manufacturing process). Preferably the blowing agent gas should have a low vapor thermal conductivity (VTC) so as to minimize conduction of heat through the insulating foam. Thus, the vapor thermal conductivities for halocarbons such as CFC-11, CFC-12 and hydrochlorodifluoromethane, $CHClF_2$ (HCFC-22), at 25° C. (i.e., 45.1, 55.7 and 65.9 $Btu \cdot ft^{-1} \cdot hr^{-1} \cdot F^{-1} \times 10^4$, respectively) compare favorably to the VTC for air at 25° C. (i.e., 150.5 $Btu \cdot ft^{-1} \cdot hr^{-1} \cdot F^{-1} \times 10^4$). From these data, it can readily be seen that the presence of a halocarbon blowing agent is required for optimum thermal insulation properties with both thermoplastic and thermoset foams.

A problem with hydrogen-containing alternative blowing agent HCFC-22 is its rapid migration from thermoplastic foams. For example, in the case of one grade of polystyrene, the permeation rate at 25° C. for CFC-12 vs. HCFC-22 was $4.2 \times 10^{-9}$ g/hr vs. $6.5 \times 10^{-8}$ g/hr (i.e., HCFC-22 diffused 15.5 times faster than CFC-12). Without some way to prevent or slow down the rate of HCFC-22 permeation from polystyrene foam, this blowing agent is unacceptable for producing good insulation foam, using this particular grade of polystyrene.

HCFC-22 is also known to diffuse rapidly from some polyurethane/polyisocyanurate foam formulations. Techniques for slowing/preventing this blowing agent migration are required if the halocarbon is to be useful in preparing these thermoset insulating foams.

In addition to the undesirable degradation of foam insulation value caused by permeation losses of blowing agent, the effect of air entry from the atmosphere into the foam cells is at least equally significant. As air enters the foam cells, the vapor thermal conductivity of the cell gas increases and the insulation value drops.

The blocking agents of this invention unexpectedly function to reduce air entry into foams and/or to reduce the permeation of hydrogen-containing blowing agents such as HCFC-22 from the foam cells, thereby producing more effective/economical insulation foams.

For the purposes of the present invention, the term "blocking agent" is used herein to denote hydrogen bond forming compounds which contain ether, ester or ketone groups or the like. These hydrogen bond forming compounds can bond or associate with hydrogen-containing halocarbon blowing agents such as HCFC-22 and thereby reduce their rates of permeation from the foam.

Unexpectedly, HCFC-22, difluoromethane ($CH_2F_2$, HFC-32), 1,1,1-trifluoro-2,2-dichloroethane ($CHCl_2CF_3$, HCFC-123), 1,1,2-trifluoro-1,2-dichloroethane ($CHClFCClF_2$, HCFC-123a), 1,1,1,2-tetrafluoro-2-chloroethane ($CHClFCF_3$, HCFC-124), pentafluoroethane ($CHF_2CF_3$, HFC-125), 1,1,2,2-tetrafluoroethane ($CHF_2CHF_2$, HFC-134), and 1,1,1,2-tetrafluoroethane ($CH_2FCF_3$, HFC-134a) have been observed to associate or hydrogen bond with compounds containing ether, ester or ketone groups. Glycols and other polyhydroxy compounds tend to form intra- or inter-molecular hydrogen bonds with themselves and thus do not associate strongly with HCFC-22. HCFC-22, with hydrogen bonding esters, ketones or ethers, exhibits dramatically reduced vapor pressure as a result of the association. Furthermore, when these hydrogen bonding compounds are present in thermoplastic polymers such as polystyrene, the permeation of HCFC-22 is reduced/slowed as the result of the mutual association which occurs between these compounds. The hydrogen bond forming agents additionally function to improve the solubility of blowing agents such as HFC-134a in thermoplastic polymers such as polystyrene.

Also, the mutual solubility of HCFC-22 and HCFC-123 or the like with several hydrogen bond forming compounds further provides evidence of an unexpected association between these materials. CFC-12 does not share this unexpected solubility characteristic. Because of the solubility of many of the hydrogen bond forming compounds in HCFC-22, these compounds are suitable for dissolving in HCFC-22 and, thus, can be made commercially available in this convenient form.

For purposes of the present invention and as previously mentioned, the blocking agent can broadly be any compound that contains either an ether, ester or ketone group or combinations of the same and is capable of hydrogen bonding or the equivalent strong association or complexing with hydrogen-containing halocarbons. For example, but not by way of limitation, the following table lists examples of ether, ester or ketone groups containing compounds which associate or hydrogen bond with hydrogen-containing halocarbons such as HCFC-22.

Hydrogen Bonding Agents (1) Polyethylene oxide polymers
(2) Ethylene oxide/propylene oxide copolymers (3) Polypropylene oxide polymers
(4) Polyethylene glycol mono- and dioleates
(5) Polyethylene glycol monostearates
(6) Alkylphenoxy polyethoxy ethanols
(7) Polyethylene oxide sorbitan monostearates and tristearates
(8) Polyethylene oxide fatty acid amides
(9) Primary and secondary alcohol ethoxylates
(10) Glyme, diglyme, triglyme and tetraglyme
(11) Mono-, di- and tripropylene glycol methyl ethers and ether acetates
(12) Dimethyl adipate, succinate and glutarate
(13) Ethylene oxide/propylene oxide adducts with a sucrose
(14) Ketones and polyketone polymers.

The use of hydrogen-containing blowing agents such as HCFC-22 with ether, ester or ketone hydrogen bond forming compounds in polymer foams does not preclude the simultaneous incorporation of blowing agents such as 1,1-dichloro-1-fluoroethane ($CCl_2FCH_3$, HCFC-141b), 1-chloro-1,1-difluoroethane ($CClF_2CH_3$, HCFC-142b), 1,1,1-trifluoroethane ($CF_3CH_3$, HFC-143a), 1,2-difluoroethane ($CH_2FCH_2F$, HFC-152), and 1,1,-difluoroethane ($CHF_2CH_3$, HFC-152a) which do not tend to form strong hydrogen bonds. It should be further appreciated that various CFCs may also be present as a component of a blowing agent mixture useful according to the present invention and that the present invention is applicable when $CO_2$, hydrocarbons or methyl formate are components of the blowing agent gas. Similarly, various additives such as stabilizers, dyes, fillers, and the like can be present in the blowing agent.

In addition to reducing the entry of air into and/or the migration of hydrogen-containing blowing agents such as HCFC-22 from thermoplastic foams, the hydrogen bond forming agents may provide other functions to the foam manufacturing process. For example, compounds such as the polyethylene oxide polymers may provide lubricity and thereby increase the extrusion throughput or production rate. Furthermore, these compounds are contemplated as potentially useful as polymer plasticizers and may contribute advantageously to other properties.

The hydrogen bond forming agents of this invention are suitable for use with thermoplastics such as polystyrene, polyethylene, polypropylene, polyvinyl chloride, and the like to prevent loss of hydrogen-containing blowing agents; however, they can also be used with thermoset polymer foams such as polyurethane, polyisocyanurate, and phenolic resin foams. Since these hydrogen bond forming agents associate with blowing agents such as HCFC-22, they will function to reduce/prevent permeation of the blowing agent in any compatible polymer foam system. Furthermore, these hydrogen bond forming agents will function in the presence of other additives normally used in polymer foams, such as stabilizers, dyes, fillers, and the like.

The blowing agent concentration used to prepare most conventional thermoplastic and thermoset polymer foams is generally in the range of about 5 weight percent to about 30 weight percent (based on total weight of the foam). To reduce migration of hydrogen-containing blowing agents such as HCFC-22, the effective use concentration of hydrogen bond forming agent is at least about 0.1 weight percent and preferably from about 1.0 to 20 weight percent (based on total formulation weight), most preferably about 0.5 weight percent to about 10 weight percent. Typically, the improved polymer foaming composition will contain from 1 to 100 parts by weight hydrogen bond forming blocking agent for every 100 parts of hydrogen-containing halocarbon blowing agent.

The actual method by which the blocking agent according to the present invention is to be incorporated into the closed cell foam can vary according to the specific application and composition being employed. In the broadest sense, the blocking agent can be treated as any other foam additive as generally known in the art. As previously stated, the blocking agent in certain applications imparts beneficial effects to the polymer phase in addition to reducing permeability and in such cases the blocking agent can be added to the polymer. Since the blocking agent is categorically a hydrogen bond forming compound, it may be advantageously added to the blowing agent or preblended into the polymer (e.g., polystyrene) prior to extrusion or other method of fabrication. In the case of thermoset foams (e.g., polyurethane/polyisocyanurate foams) the hydrogen bond forming agents can be added to the foam in the isocyanate (A-side) or the polyol (B-side) or added with the blowing agent at the mixing head where the A-side and B-side are combined (i.e., third-streamed). If the hydrogen bond forming agent used contains free hydroxyl groups, this must be taken into account when calculating the hydroxyl equivalent for the B-side system. In the case where the blocking agent is preferentially more soluble in one of the foam components, it is preferably added to that component. For example, addition of the blocking agent to the polyol component of two-component thermoset resin is preferred. Of course, the addition to more than one component or either component is also contemplated. In the case of phenolic foams, the hydrogen bond forming agents can be added to the foam by preblending into the resole or added separately at the mixing head prior to the foam laydown. The most preferred method of adding the blocking agent is to mix it with the blowing agent and as such the admixture of HCFC or HFC and blocking agent is contemplated as being a commercially attractive product, per se.

The present instant invention further relates to producing polyisocyanate-based foams utilizing selected combinations of blowing agents and active hydrogen-containing compositions, including isocyanate-reactive blends thereof, e.g., typically known in this art as B-side compositions. The invention also includes processes for producing polyurethane and polyisocyanurate closed-cell foams which comprise contacting a polyisocyanate with the active hydrogen-containing material under reaction conditions and while in the presence of the polyfluorinated blowing agent comprising a major weight proportion of HFC-134. The reactants may be brought together under reaction conditions separately, but substantially simultaneously, or, if the reactants are taken together, the blowing agent is such that it corresponds to less than about 25 mole percent water and greater than about 75 mole percent polyfluorocarbon blowing agent, e.g., less than 20 and normally less than about 10 mole percent water and the balance comprising polyfluorocarbon. It will be appreciated that some water in the reaction system is generally present when considering many of the active hydrogen-containing compositions, notably the polyether polyols, are hygroscopic. The relatively low water levels defined herein are normally considered not to contribute any significant amounts of $CO_2$ to the foaming process. Active hydrogen-containing compounds useful in this invention include those that are normally liquid and have two or more groups that contain a hydrogen atom reactive with an isocyanate group. More specifically, suitable hydrogen-containing compounds have two or more hydroxyl groups per molecule and an equivalent weight of about 50 to about 700, normally about 70 to about 300 and desirably about 90 to about 270. Typically, suitable hydrogen-containing compounds are aliphatic and cycloaliphatic polyols carrying 2 to 16, more usually 3 to 8 hydroxyl groups.

While any suitable polyol or mixtures thereof can be employed in the instant invention, examples of suitable polyols comprise polyether polyols such as polyethylene oxides, polypropylene oxides, mixed polyethylene-propylene oxides with terminal hydroxyl groups, among others. Other suitable polyols can be prepared by reacting ethylene and/or propylene oxide with an initiator having 2 to 16, generally 3 to 8 hydroxyl groups as present, for example, in glycerol, pentaerythritol and carbohydrates such as sorbitol, glucose, sucrose and the like polyhydroxy compounds. Suitable polyether polyols can also include alaphatic or aromatic amine-based polyols. Aromatic polyester polyols may also be employed in the instant invention, e.g., those made by transesterifying polyethylene terephthalate (PET) scrap with a glycol such as diethylene glycol, or made by reacting phthalic anhydride with a glycol. The resulting polyester polyols may be reacted further with ethylene- and/or propylene oxide—to form an extended polyester polyol containing additional internal alkyleneoxy groups.

The polyisocyanate-based foams of the present invention can be prepared by contacting under reaction conditions at least one organic polyisocyanate with at least one active hydrogen-containing compound described hereinabove while in the presence of the polyfluorocarbon blowing agent also described hereinabove, with the latter two components preferably employed as an isocyanate-reactive preblend, e.g., B-side composition. The B-side composition of this invention can be prepared in any manner convenient to one skilled in this art, including simply weighing desired quantities of each component and, thereafter, combining them in an appropriate container at appropriate temperatures and pressures.

The concentration of the blowing agent relative to that of the active hydrogen-containing compound, whether used separately or as a preblend, is normally in the range of from about 5 to about 45 weight percent based on the total weight of these two components, more usually from about 8 to about 35, with from about 10 to at least about 25 weight percent preferred in most cases.

When preparing polyisocyanate-based foams, the polyisocyanate reactant is normally selected in such proportion relative to that of the active hydrogen-containing compound that the ratio of the equivalents of isocyanate groups to the equivalents of active hydrogen groups, i.e., the isocyanate index, is from about 0.9 to about 10 and in most cases from about 1 to about 4. The quantity of the blowing agent composition employed relative to that of the active hydrogen-containing composition is normally also selected within the above 5 to about 45 weight percent range effective to result in a foam whose overall density is in the range of from about 10 to about 500, normally from about 25 to about 100, and usually from about 25 to about 35 kilograms per cubic meter (kg/m3) (wherein 1 kg/m3 equals 0.062 pounds per cubic foot (pcf)).

While any suitable polyisocyanate can be employed in the instant process, examples of suitable polyisocyanates useful for making polyisocyanate-based foam comprise at least one of aromatic, aliphatic and cycloaliphatic polyisocyanates, among others. Representative members of these compounds comprise diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), napthylene-1,5-diisocyanate, 1-methylphenyl-2,4-phenyldiisocyanate, diphenylmethane-4,4-diisocyanate, diphenylmethane-2,4-diissocyanate, 4,4-biphenylenediisocyanate and 3,3-dimethyoxy-4,4 biphenylenediisocyanate and 3,3-dimethyldiphenylpropane-4,4-diisocyanate; triisocyanates such as toluene-2,4,6-triisocyanate and polyisocyanates such as 4,4-dimethyldiphenylmethane -2,2,5,5-tetraisocyanate and the diverse polymethylenepoly-phenylopolyisocyanates, mixtures thereof, among others.

A crude polyisocyanate may also be used in the practice of this invention, such as the crude toluene diisocyanate obtained by the phosgenating a mixture comprising toluene diamines, or the crude diphenylmethane diisocyanate obtained by the phosgenating crude diphenylmethanediamine. Specific examples of such compounds comprise methylene-bridged polyphenylpolyisocyanates, due to their ability to crosslink the polyurethane. The isocyanate index (ratio of equivalents of isocyanates to equivalents of active hydrogen-containing groups) is advantageously from about 0.9 to about 10, in most cases preferably about 1.0 to about 4.0.

It is often desirable to employ minor amounts of certain other ingredients in preparing polyisocyanate-based foams. Among these additional ingredients comprise one or members from the group consisting of catalysts, surfactants, flame retardants, preservatives, colorants, antioxidants, reinforcing agents, filler, antistatic agents, among others well known in this art.

Depending upon the composition, a surfactant can be employed to stabilize the foaming reaction mixture while curing. Such surfactants normally comprise a liquid or solid organosilicone compound. The surfactants are employed in amounts sufficient to stabilize the foaming reaction mixture against collapse and to prevent the formation of large, uneven cells. About 0.2 to about 5 parts or even more of the surfactant per 100 parts by weight polyol are usually sufficient.

One or more catalysts for the reaction of the polyol with the polyisocyanate may be also employed. While any suitable urethane catalyst may be employed, specific catalyst comprise tertiary amine compounds and organometallic compounds. Exemplary such catalysts are disclosed, for example, in U.S. Pat. No. 5,164,419, which disclosure is incorporated herein by reference. For example, a catalyst for the trimerization of polyisocyanates, such as an alkali metal alkoxide, alkali metal carboxylate, or quaternary amine compound, may also optionally be employed herein. Such catalysts are used in an amount which measurably increases the rate of reaction of the polyisocyanate. Typical amounts are about 0.1 to about 5 parts of catalyst about per 100 parts by weight of polyol.

In one process of the invention for making a polyisocyanate-based foam, the polyol(s), polyisocyanate and other components are contacted, thoroughly mixed, and permitted to expand and cure into a cellular polymer. The mixing apparatus is not critical, and various conventional types of mixing head and spray apparatus are used. By conventional apparatus is meant apparatus, equipment, and procedures conventionally employed in the preparation of isocyanate-based foams in which conventional isocyanate-based foam blowing agents, such as fluorotrichloromethane ($CCl_3F$, CFC-11), are employed. Such conventional apparatus are discussed by: H. Boden et al. in chapter 4 of the Polyurethane Handbook, edited by G. Oertel, Hanser Publishers, New York, 1985; a paper by H. Grunbauer et al.

titled "Fine Celled CFC-Free Rigid Foam—New Machinery with Low Boiling Blowing Agents" published in Polyurethanes 92 from the Proceedings of the SPI 34th Annual Technical/Marketing Conference, Oct. 21–Oct. 24, 1992, New Orleans La.; and a paper by M. Taverna et al. titled "Soluble or Insoluble Alternative Blowing Agents? Processing Technologies for Both Alternatives, Presented by the Equipment Manufacturer", published in Polyurethanes World Congress 1991 from the Proceedings of the SPI/ISOPA Sep. 24–26, 1991, Acropolis, Nice, France. These disclosures are hereby incorporated by reference. The low vapor pressure of B-side compositions containing blowing agent comprising HFC-134 allow such B-side compositions to be employed in isocyanated-based foam production in such conventional apparatus.

In another process of the invention, a preblend of certain raw materials is prepared prior to reacting the polyisocyanate and active hydrogen-containing components. For example, it is often useful to blend the polyol(s), blowing agent, surfactant(s), catalysts(s) and other components, except for polyisocyanates, and then contact this blend with the polyisocyanate. Alternatively, all the components may be introduced individually to the mixing zone where the polyisocyanate and polyol(s) are contacted. It is also possible to pre-react all or a portion of the polyol(s) with the polyisocyanate to form a prepolymer.

The invention composition and processes are applicable to the production of all kinds of expanded polyurethane foams, including, for example, integral skin, RIM and flexible foams, and in particular rigid closed-cell polymer foams useful in spray insulation as foam-in-place appliance foams, or rigid insulating board stock and in laminates.

EXAMPLES

The following examples are presented to further illustrate specific critical properties of various specific embodiments of the present invention, including vapor pressure, boiling point and permeation data, as well as similar properties, for comparison purposes, of systems and compositions outside the scope of the invention.

Example 1

The solubilities of several representative hydrogen bond forming agents in HCFC-22 were determined for 10 wt. % solutions at ambient temperature (approximately 21° C.). The solutions were prepared by combining the hydrogen bond forming agents with HCFC-22 in 4 oz. plastic-coated pressure bottles. Solubility was determined by visual examination. Table I lists ten hydrogen bond forming compounds which are soluble to >10 wt. % in HCFC-22. These hydrogen bond forming agents are soluble in HCFC-22, HCFC-123 and HCFC-123a because of their bonding or association; whereas, they are generally insoluble in CFC-12. The hydrogen bond forming agents are also soluble in HCFC-141b.

Table I

Hydrogen Bonding Agents Solubility in HCFC-22

The following hydrogen bonding agents are soluble at ambient temperature in HCFC-22 to >10 wt. %.:

| Hydrogen Bonding Agents |
|---|
| "PLURONIC" F-108 |
| "CARLOWAX" 3350 |
| "WITCONOL" H3SA |
| "TRITON" X-67 |
| Polypropylene Glycol 2025 |
| "ETHOFAT" 0/20 |
| "ETHOMID" HT/60 |
| "TERGITOL" 15-S-20 |
| "ETHOX" DO-9 |
| "TERGITOL" NP-40 |

Solubilities determined at ambient temperature (approximately. 21° C.). Similar solubilities have been observed for HCFC-123, HCFC-123a, and HCFC-141b even though HCFC-141b is not a strong hydrogen bond forming HCFC.

Example 2

Vapor pressure data were obtained for mixtures of CFC-12 and HCFC-22, respectively, with hydrogen bonding agents. In these tests, 30 grams of blowing agent was combined with 70 grams of hydrogen bond forming agent in a 4 oz. plastic-coated pressure bottles. After thermostatting the bottles at 21° C., the vapor pressures were determined using a pressure gauge accurate to 0.1 psi. Although HCFC-22 by itself has considerably higher vapor pressure at 21° C. than CFC-12 (121.4 psig vs. 70.2 psig), the formation of hydrogen bonds between the hydrogen bond forming agents and HCFC-22 resulted in dramatic vapor pressure depressions to values much lower than for CFC-12. The vapor pressure data are summarized in Table II.

Boiling point data were obtained for a 30/70 blend Or HCFC-123/DBE. The data in Table IIA show an elevation in boiling point (relative to the value calculated from Raoult's Law) of 17° C. as the result of the association or hydrogen bonding which occurs between these materials. Similar boiling point elevations were observed for 30/70 blends of HCFC-123/DPM and HCFC-123/DPMA.

Table IIB shows vapor pressure data for HFC-32, HCFC-124, HFC-125, HFC-134 and HFC-134a with DBE, acetone, and 2-pentanone. Each hydrogen bond forming agent depresses the vapor pressure of the blowing agents.

TABLE II

Effect of Hydrogen Bonding Agents on Vapor Pressure of HCFC-22

| Bonding Agent | Blowing Agent Wt. % | Vapor Pressure at 21° C. psig CFC-12 | HCFC-22 |
|---|---|---|---|
| None | 100.0 | 70.2 | 121.4 |
| "CARBOWAX" 3350 | 30.0 | 70.2 | 57.2 |
| "PLURONIC" F-108 | 30.0 | 70.2 | 55.5 |
| "WITCONOL" N35A | 15.0 | 44.0 | 20.0 |
|  | 30.0 | 70.2 | 38.0(*) |
| "TRITON" X-67 | 15.0 | 70.2 | 29.5 |
|  | 30.0 | 70.2 | 41.0 |
| "TWEEN" 61 | 30.0 | 70.2 | 70.5 |
| Polypropylene Glycol 2625 | 30.0 | 49.2(*) | 39.3(*) |
| "ETHOFAT" 0/20 | 30.0 | 57.5(*) | 35.0(*) |
| "ETHOMID" HT/60 | 15.0 | 70.2 | 18.5 |
|  | 30.0 | 70.2 | 29.0 |

TABLE II-continued

Effect of Hydrogen Bonding Agents
on Vapor Pressure of HCFC-22

| Bonding Agent | Blowing Agent Wt. % | Vapor Pressure at 21° C. psig CFC-12 | HCFC-22 |
|---|---|---|---|
| "CARBOWAX" 8000 | 30.0 | 70.2 | 61.0 |
| Polyethylene Glycol Cpd 20M | 30.0 | 70.2 | 55.2 |
| "POLYOX" WSRN-10 | 30.0 | 70.2 | 56.5 |
| "TERGITOL" 15-S-20 | 15.0 | 70.2 | 15.0 |
|  | 30.0 | 70.2 | 26.5(*) |
| "TERGITOL" 24-L-92 | 30.0 | 59.2(*) | 31.0(*) |
| "TERGITOL" NP-40 | 30.0 | 70.2 | 44.0 |
| Polypropylene Glycol 425 | 30.0 | 54.0(*) | 37.0(*) |
|  |  | (112.5 at 54° C.) | (93.0 at 54° C.) |
| "PLURACOL" 975 | 15.0 | 46.0(*) | 17.0 |
|  |  | (110.0 at 54° C.) | (49.0 at 54° C.) |
|  | 30.0 | 70.2 | 50.5(*) (2 phases) |
| "ETHOX" DO-9 | 30.0 | 53.7(*) | 39.5(*) |
| Diglyme | 30.0 | 26.0(*) | 7.01(*) |
| Glyme | 30.0 | 16.0 | 2.5(*) |
| DBE | 30.0 | 45.0(*) | 21.5(*) |
| "ARCOSOLV" PN | 30.0 | 35.0(*) | 19.5(*) |
| Acetone | 30.0 | 19.5(*) | 5.9(*) |
| 2-Pentanone | 30.0 | 40.5(*) | 14.5(*) |
| Polymethylvinyl Ketone | 30.0 | 61.0(*) | 45.5(*) |

(* solution)

TABLE IIA

Boiling Point Elevation Data

| Compound | Boiling Point. ° C. Actual | Raoult's Law |
|---|---|---|
| HCFC-123* | 27.6 | — |
| DBE | 196 | — |
| 30/70 HCFC-123*/DBE | 81 | 64 |
| DPM | 188 | — |
| 30/70 HCFC-123*/DPN | 88 | 67 |
| DPMA | 200 | — |
| 30/70 HCFC-123*/DPMA | 93 | 60 |

*Commercial grade; typically including up to about 10 percent HCFC-232a.

TABLE IIB

Effect of Hydrogen Bonding Agents
on Vapor Pressures of
CFC-124, HFC-125, HFC-134, HFC-134a and HFC-32

| Bonding Agent | Blowing Agent | Blowing Agent Wt. % | Vapor Pressures at 21° C. psig |
|---|---|---|---|
| None | CFC-114 | 100.0 | 12.9 |
| DBE | CFC-114 | 30.0 | 12.7(*) |
| None | HCFC-124 | 100.0 | 34.1 |
| DBE | HCFC-124 | 30.0 | 1.2(*) |
| Acetone | HCFC-124 | 30.0 | 0(*) |
| 2-Pentanone | HCFC-124 | 30.0 | 1.8(*) |
| None | HFC-125 | 100.0 | 163.8 |
| DBE | HFC-125 | 30.0 | 35.0(*) |
| Acetone | HFC-125 | 30.0 | 10.0(*) |
| None | HFC-134a | 100.0 | 81.3 |
| DBE | HFC-134a | 30.0 | 15.3(~) |
| Acetone | HFC-134a | 30.0 | 3.5(*) |
| 2-Pentanone | HFC-134a | 30.0 | 12.0(*) |
| None | HFC-134 | 100.0 | 60.2 |
| DBE | HFC-134 | 30.0 | 7.0(*) |
| Acetone | HFC-134 | 30.0 | 0(*) |
| None | HFC-32 | 100.0 | 206.3 |
| Acetone | HFC-32 | 30.0 | 41.0(*) |

(* solution)

Example 3

For comparison purposes, HCFC-22 was combined with non-hydrogen bonding agents, such as stearyl stearamide ("KEMAMIDE" S-160) and glycerol monostearate ("WITCONOL" MST), and the vapor pressure of HCFC-22 showed slight, if any, depression. Thus, compounds which form strong hydrogen bonds with themselves, e.g., glycerol monostearate, do not associate with HCFC-22 and do not reduce the measured vapor pressure. The vapor pressure data are shown in Table III.

TABLE III

Vapor Pressure for HCEC-22
with Non-Hydrogen Bonding Agents

| Additive | Blowing Agent Wt. % | Vapor Pressure at 21° C. psig CEC-12 | HCEC-22 |
|---|---|---|---|
| None | 100.0 | 70.2 | 121.14 |
| "KEMAMIDE" S-180 | 30.0 | 70.2 | 121.4 |
| "WITCONOL" MST | 30.0 | 70.2 | 118.10 |
| "ALRAMIDE" HTDE | 30.0 | 70.2 | 105.0 |
| "ARMID" O | 30.0 | 70.2 | 118.0 |
| "SPAN" 60 | 30.0 | 70.2 | 108.5 |
| Glycerin | 30.0 | 70.2 | 121.4 |
| "SELAR" OH 3007 | 30.0 | 70.2 | 121.4 |
| "SELAR" PA 7426 | 30.0 | 70.2 | 121.4 |
| "SURLYN"8396-2 | 30.0 | 70.2 | 121.4 |
| Polyacrylonitrile A-7 | 30.0 | 70.2 | 120.3 |
| "SOLEF" 1008-1001 | 30.0 | 70.2 | 121.4 |
| "ELVANOL" 90-50 | 30.0 | 70.2 | 121.4 |

Example 4

The permeation of nitrogen and HCFC-22 through polystyrene film was measured for polymer films with and without blocking agents.

The permeation data was obtained on 15–20 mil thick polystyrene films which were prepared as follows:

(a) Hydrogen bond forming agents and polystyrene were passed through a twin screw extruder three times at 204° C. to ensure good blending of components. The extruder used was a 28 mm Werner and Pfleider, Stuttgart, Model 20S-K-28 twin screw.

(b) After pelletizing the extruded polymer, 15–20 mil thick films (in 6"×6" sheets) were pressed at about 35,000 psig pressure using a Barber-Coleman press.

(c) The 6"×6" sheets of 15–20 mil film were cut into 47 mm diameter circles or discs with a polymer die punch.

Permeation tests were run on polystyrene films containing various blocking agents to determine the permeation of air and blowing agents in polystyrene foam. Such film closely simulates polystyrene foam cell walls and the permeation data are predictive of foam blowing agent retention and susceptibility to air intrusion. Studies were made with HCFC-22 and nitrogen (simulating air).

Polystyrene Film Preparation (A) Mixing Polystyrene/Additives by Extrusion

Samples of polystyrene (2500 grams) plus blocking agents were hand mixed and passed through a screw extruder three times at about 204° C. Three passes were used to ensure uniform blending of components. Since the polymer mixes were extruded into a water tank for cooling prior to pelletizing (between the passes through the extruder and after the third extrusion), the pelletized samples were dried about 16 hours in a vacuum oven at 79–93° C. The extruder used was a 28 mm Werner and Pfleider, Stuttgart, Model 20S-K-28 twin screw.

(B) Film Pressing of Polystyrene/Additive Mixtures

Using a Barber-Coleman press, 30 gram samples of polystyrene/additive mixes (as pellets) were pressed into 6"×6" sheets of film with 15–20 mil thickness. The pressing was done at 204° C. and at a pressure of about 35,000 psig (maintained for 5 minutes).

(C) Film Discs for Permeation Tests

Discs (15–20 mil thickness) were cut from 6"×6" sheets of film. Five discs of 47 mm diameter were made from each sheet. The discs were cut or stamped at ambient temperature using a die punch made of A-2 type steel (hardened).

Permeation Test Procedure

The permeation tests on the polystyrene film containing blocking agents were conducted by a modification of ASTM D1434-82, "Standard Method of Determining Gas Permeability Characteristics of Plastic Film and Sheeting". This modified procedure is described in the Haster of Chemical Engineering Thesis, P. S. Mukherjee, Widener University, Chester, Pa., February 1988, entitled "A Study of the Diffusion and Permeation Characteristics of Fluorocarbons Through Polymer Films".

Test Conditions (1) All tests were run at a 20 psia pressure differential between the high pressure side and the low pressure side of the permeation cell.

(2) Permeation tests were run at 60 to 120° C., with tests for each blocking agent/polystyrene/gas combination being run at two or more temperatures. Data for other temperatures were calculate from the equation:

$$\ln P = A/T + B$$

where P is permeation coefficient, T is K (° C.+273.2) and A and B are constants determined from the permeation coefficients calculated from the following equation:

$$P = \frac{(\text{Rate of Permeation})(\text{Film Thickness})}{(\text{Film Area})(\text{Pressure drop across film})}$$

(3) The permeation rates are based on a 1 cm² by 1 cm thick film with a 1.0 psia pressure drop across the film.

The permeation rate and permeation coefficient data for nitrogen in polystyrene containing blocking agents are summarized in Table IV. Data for HCFC-22 in polystyrene containing blocking agents are shown in Table V. The units for permeation rate are g/hr and for permeation coefficient are cm³ (STP).cm/sec.cm².cmHg. The data summarized in Tables IV and V are calculated at 25° C. from data measured at other temperatures.

TABLE IV

Permeation Data
Polymer: Polystyrene* Temperature: 25° C.

| Gas | Blocking Agent | Wt. % in Polymer | Permeation Coeff. cm³ gas at STP cm sec cm² (cm Hg) | Permeation % Change In Rate g/hr | Permeation Rate |
|---|---|---|---|---|---|
| Nitrogen | None | — | $8.00 \times 10^{-11}$ | $1.86 \times 10^{-9}$ | — |
| Nitrogen | "WITCONOL" | 5.0 | $5.50 \times 10^{-11}$ | $1.28 \times 10^{-9}$ | −31.2 |
| Nitrogen | "TRITON" X-67 | 5.0 | $4.49 \times 10^{-11}$ | $1.94 \times 10^{-9}$ | −44.1 |
| Nitrogen | Polypropylene Glycol 2025 | 5.0 | $4.72 \times 10^{-11}$ | $1.10 \times 10^{-9}$ | −40.9 |
| Nitrogen | "TWEEN" 61 | 5.0 | $4.672 \times 10^{-11}$ | $1.07 \times 10^{-9}$ | −42.5 |

TABLE V

Permeation Data
Polymer: Polystyrene* Temperature: 25° C.

| Gas | Blocking Agent | Wt. % in Polymer | Permeation Coeff. cm³ gas at STP cm sec cm² (cm Hg) | Permeation % Change In Rate g/hr | Permeation Rate |
|---|---|---|---|---|---|
| HCFC-22 | None | — | $5.41 \times 10^{-12}$ | $3.89 \times 10^{-10}$ | — |
| HCFC-22 | "WITCONOL" | 5.0 | $2.21 \times 10^{-12}$ | $1.58 \times 10^{-10}$ | −59.4 |

*"DYLENE" 8 polystyrene (Melt Index 6–7), Arco Chemical Company.

The chemicals used in the previous Examples and tests are identified structurally and by source as follows:

| Designation | Structure | Source |
|---|---|---|
| "CARBOWAX" 3350 | Polyethylene glycol | Union Carbide Corp. |
| "CARBOWAX" 8000 | Polyethylene glycol | Union Carbide Corp. |
| "Pluronic" E-108 | Ethylene oxide/propylene | BASF Wyandotte Corp. |
| "WITCONOL" H35A | Polyethylene glycol (400) stearate | Witco Corp. |
| "WITCONOL" MST | Glycerol monostearate | Witco Corp. |
| "TRITON" X-67 | Alkylpoly-ethoxy ethanol | Rohm and Haas Co. |
| "TWEEN" 61 | POE (4) sorbitan stearate | ICI Americas, Inc. |
| Polypropylene Glycol 2025 | Polypropylene glycol | Union Carbide Corp. |
| "ETHOFAT" 0/20 | Polyethylene oxide oleate | Akzo Chemie America |
| "ETHOMID" HT/60 | Polyethylene oxide fatty acid amide | Akzo Chemie America |
| Polyethylene Glycol Cpd 20M | Polyethylene glycol | Union Carbide Corp. |
| "POLYOX" WSRN-10 | Polyethylene oxide | Union Carbide Corp. |
| "TERGITOL" 15-S-20 | Linear alcohol/ethylene oxide | Union Carbide Corp. |
| "TERGITOL" 24-L-92 | Linear alcohol/ethylene oxide | Union Carbide Corp. |
| "TERGITOL" NP-40 | Nonylphenol/ ethylene oxide | Union Carbide Corp. |
| Polypropylene Glycol 425 | Polypropylene glycol | Union Carbide Corp. |
| "PLURACOL" 975 | Sucrose polyol | BASF Wyandotte Corp. |
| "ETHOX" DO-9 | Polyethylene glycol dioleate | Ethox Chemicals Inc. |
| Glyme | Ethylene glycol di-methylether | Aldrich Chemical Co. |
| Diglyme | 2-Methoxy-ethyl ether | Aldrich Chemical Co. |
| DBE | Mixture of dimethyl adipate, dimethyl gluta-rate and di-methyl succinate* | Du Pont Co. |
| "ARCOSOLV" PM | Propylene glycol mono-ethyl ether | Arco Chemical co. |
| "ARCOSOLV" DPM | Dipropylene glycol mono-methyl ether | Arco Chemical Co. |
| "ARCOSOLV" DPMA | Dipropylene glycol mono-methyl ether acetate | Arco Chemical Co. |
| "KEMAMIDE" S-180 | Stearyl stearamide | Witco Corp. |
| Acetone | — | Fisher Scientific |
| 2-Pentanone | Methyl propyl ketone | Pfaltz and Bauer, Inc. |
| "ALKAMIDE" HTDE | stearic diethanolamide | Alkaril Chemicals, Ltd |
| "ARMID" O | Oleamide | Akzo Chemie America |
| "SPAN" 60 | Sorbitan stearate | ICI Americas, Inc. |
| Glycerin | — | Aldrich Chemical Co. |
| "SELAR" OH 3007 | Ethylene/ vinyl alcohol copolymer | Du Pont Co. |
| "SELAR" PA 7426 | Amorphous nylon | Du Pont Co. |
| "SURLYN" 8396-2 | Ethylene/ methacrylic acid copolymer | Du Pont Co. |
| Polymeric Acrylonitrile A-7 | Acrylonitrile/ methyl acrylate copolymer | DuPont Co. |
| "SOLEF" 1008-1001 | Polyvinyli-dene fluoride | Soltex Polymer Corp. |
| "ELVANOL" 90-50 | Polyvinyl alcohol | Du Pont Co. |
| "DYLENE" 8 | Polystyrene | Arco Chemical Co. |
| Polymethylvinyl Ketone (8919) | — | Honomer-Polymer Laboratories, Inc. |
| CFC-12 | Dichlorodifluoro-methane | Du Pont Co. |
| CFC-114 | 1,2-dichlorotetra-fluoroethane | Du Pont Co. |
| HCFC-22 | Chlorodifluoro-methane | Du Pont Co. |
| HCFC-123 | 1,1,1-trifluoro-2,2-dichloroethane | Du Pont Co. |
| HCFC-123a | 1,1,2-trifluoro-1,2-dichloroethane | Du Pont Co. |
| HCFC-124 | 1,1,1,2-tetrafluoro-chloroethane | Du Pont Co. |
| HFC-125 | Pentafluoroethane | Du Pont Co. |
| HFC-32 | Difluoromethane | Du Pont Co. |
| HFC-134 | 1,1,2,2-tetrafluoro-ethane | Du Pont Co. |
| HFC-134a | 1,1,1,2-tetrafluoro-ethane | Du Pont Co. |
| HCFC-141b | 1-fluoro-1,1-di-chloroethane | Du Pont Co. |

*17/66/16.5 mixture of esters

Examples 5 through 12

The following examples show the relative solubilities and associated vapor pressures of HFC-134 and HFC-134a in various polyether polyols over a range of temperatures and concentrations. The solubilities are in weight percent of the polyfluorocarbon in solution in the polyol, and the vapor pressures exerted by the candidate blowing agent are expressed as saturated vapor pressures in pounds per square inch absolute (psia). The dissolution of the polyfluorocarbon in the polyol and the measurement of vapor pressures at the different concentrations and temperatures were conducted as follows:

Solubility Test Procedure

The solubility tests were run in Fischer and Porter Glass Pressure Reaction Vessel. The polyol was added to the vessel and deaerated to eliminate the interference of air in the pressure measurements. Liquid HFC was then pressure added in increments and thoroughly mixed. At each increment, the solution was visually inspected for phase separation and vapor pressure was recorded. This was done in constant temperature bath at three (3) temperatures: 10° C., 25° C., 50° C. The limit of solubility was determined by the point at which two layers or an emulsion formed. The vapor pressure was measured after thoroughly mixing, and equilibrating temperature. The gauge pressure was converted to absolute pressure, PSIA, by correcting for barometric pressure. For comparison, following are: (a) the normal boiling points in degrees centigrade of HFC-134, HFC-134a and, for further reference, HFC-152a; and (b) the vapor pressures of these substances at 10, 25 and 50° C.

TABLE VI

| HFC | B.P., °C. | Vapor Pressures, psia | | |
|---|---|---|---|---|
| | | 10° C. | 25° C. | 50° C. |
| 134 | −19.7 | 46.7 | 76.3 | 154.4 |
| 134a | −26.5 | 60.2 | 96.6 | 191.3 |
| 152a | −24.2 | 54.0 | 86.5 | 170.7 |

Example 5

FIG. 1 is a graphical representation of wt. % blowing agent plotted vs. pressure. FIG. 1 illustrates that HFC-134 exerts much lower saturated vapor pressures over the range of indicated concentrations in a sucrose based polyether polyol, polyol A, than either HFC-134a or HFC-152a, which translates into a higher degree of utility for HFC-134 as blowing agent for polyisocyanate-based foam production.

That the lower saturated vapor pressures of HFC-134 relative to those of HFC 134a, for example, are not attributable to its higher boiling point alone can be seen by comparing the ratios of the normal vapor pressures of the two isomers at 25° C., viz. 76.3/96.6=0.79 against ratios of the saturated vapor pressures taken from FIG. 1 at 10, 15, 20 and 25 weight % of blowing agent at the same 25° C. temperature, which ratios are: 18/25=0.72; 21/40=0.53; 35/65=0.54 and 40/75=0.53, respectively. The lower saturated vapor pressure ratios reflect the unexpected much higher degree of salvation of HFC-134 by the polyol, hence lower saturated vapor pressures. The same conclusions regarding salvation characteristics, hence blowing agent utility, can be drawn by comparing the saturated vapor pressures of HFC-134 versus those of HFC-152a, and of HFC-134a versus HFC-152a.

Example 6

This example compares the solubility and saturated vapor pressure characteristics of HFC-134 with those of HFC-134a in a blended polyether polyol normally used to make Intragal Skin Foam, Polyol B. The experimental data are given in Table VII.

The data further indicate the polyol-HFC-134 blend may be employed at lower pressures at ordinary temperatures over a higher range of blowing agent concentrations than comparable blends utilizing HFC-134a.

Example 7

The procedure of Examples 5 and 6 was repeated employing a propylene oxide polyether polyol, Polyol C. The saturated vapor pressure results are given in Table VIII.

The data again establishes the superiority of HFC-134 over the HFC-134a isomer in that (1) the saturated vapor pressures exerted by HFC-134 are lower than those of HFC-134a at substantially all concentrations and temperatures, and (2) HFC-134 provides for homogeneous solutions over a greater range of concentrations and temperatures.

Example 8

The procedure of the previous 3 examples was repeated with a sucrose polyether, Polyol A. The results are given in Table IX.

The superiority of the saturated vapor characteristics of the solutions of HFC-134 over those of HFC-134a over the range of concentrations and temperatures employed is evident from the tabulated data. For example, with HFC-134 at 25 weight percent concentration less than 2 atmospheres pressure would be required to maintain solution at 10° C. and less than 3 atmospheres at 25° C. In contrast, with HFC-134a at the same concentration, 3 atmospheres or more would be required at 10° C. and 5 atmospheres or more at 25° C. The substantially lower pressure requirement of HFC-134 translates into a more economic process of using this isomer as blowing agent in combination with the active hydrogen component in a polyisocyanate foaming process.

Example 9

The procedure of the previous 4 Examples was repeated using a sucrose amine based polyether polyol, Polyol D.

The saturated vapor pressure data are tabulated in Table X and again show the superiority of HFC-134 over HFC-134a in exerting much lower saturated vapor pressures over its blends with the polyol at all concentrations and temperatures employed, useful for the production of polyisocyanate-based foams.

Example 10

The solubility data (Table XI) demonstrate HFC-134 superior solubility with the aromatic-amine-type polyol, Polyol E, for polyisocyanate-based foam production. HFC-134a forms two phases at all the indicated concentrations and temperatures, while in contrast, HFC-134 forms homogeneous solutions over a broad range of concentrations and temperatures.

Example 11

This example compares the saturated vapor pressures of HFC-134 and HFC-134a mixtures with two typical aromatic polyester polyols. Polyol F is a phthalic anhydride based polyester, and Polyol G is a PET based polyester polyol. The data in tables XIIA and, XIIB below again establish the greater solubility of the HFC-134 isomer in polyester type polyols.

TABLE VII

| Polyol B (polyether blend) | | | | | | | | | |
|---|---|---|---|---|---|---|---|---|---|
| | Saturated Vapor Pressure (psia) | | | | | Saturated Vapor Pressure (psia) | | | |
| wt. % HFC-134 | 10° C. | 25° C. | 50° C. | Comments | wt. % HFC-134a | 10° C. | 25° C. | 50° C. | Comments |
| 2.1 | 15 | 15 | 15 | | 2.4 | 15 | 15 | 15 | |
| 4.5 | 15 | 15 | 15 | | 4.1 | 15 | 18 | 20 | |
| 6.3 | 15 | 15 | 16 | | 5.8 | 15 | 15 | 27 | |

TABLE VII-continued

Polyol B (polyether blend)

| wt. % HFC-134 | Saturated Vapor Pressure (psia) | | | | wt. % HFC-134a | Saturated Vapor Pressure (psia) | | | |
|---|---|---|---|---|---|---|---|---|---|
| | 10° C. | 25° C. | 50° C. | Comments | | 10° C. | 25° C. | 50° C. | Comments |
| 8.4 | 15 | 15 | 21 | | 8.5 | 15 | 22 | 41 | |
| 10.2 | 15 | 15 | 26 | | 10.1 | 20 | 25 | 47 | |
| 12.4 | 15 | 15 | 31 | | 12.3 | 21 | 32 | 58 | |
| 20.0 | 16 | 24 | 49 | | 20.5 | 31 | 50 | 93 | |
| 25.1 | 20 | 31 | 6b | | 25.4 | 37 | 62 | 95 | |
| 30.1 | 24 | 39 | 75 | | 30.2 | 42 | 67 | 101 | |
| 35.2 | 27 | 46 | 78 | | 35.2 | 48 | 76 | 105 | |
| 40.17 | 33 | 50 | 79 | 2 phases @ 50° C. | 41.2 | 53 | 87 | 125 | 2 phases @ 50° C. |

TABLE VIII

Polyol C (propylene-oxide polyether)

| wt. % HFC-134 | Saturated Vapor Pressure (psia) | | | | wt. % HFC-134a | Saturated Vapor Pressure (psia) | | | |
|---|---|---|---|---|---|---|---|---|---|
| | 10° C. | 25° C. | 50° C. | Comments | | 10° C. | 25° C. | 50° C. | Comments |
| 5.7 | 17 | 15 | 18 | | 5.8 | 15 | 15 | 23 | |
| 10.6 | 19 | 19 | 33 | | 8.1 | 22 | 24 | 36 | |
| 15.5 | 18 | 25 | 47 | | 14.9 | 38 | 43 | 72 | |
| 20.6 | 23 | 34 | 61 | | 21.9 | 43 | 64 | 103 | |
| 26.5 | 27 | 43 | 72 | | 25.3 | 46 | 72 | 105 | 2 phases @ 50° C. |
| 30.1 | 31 | 48 | 79 | | 33.3 | 52 | 83 | 115 | 2 phases @ all temperatures |
| 34.8 | 33 | 55 | 79 | | 40.3 | 58 | 90 | 119 | 2 phases @ all temperatures |
| 40.2 | 37 | 57 | 60 | | 47.7 | 60 | 94 | 147 | 2 phases @ all temperatures |

TABLE IX

Polyol A (sucrose polyether)

| wt. % HFC-134 | Saturated Vapor Pressure (psia) | | | | wt. % HFC-134a | Saturated Vapor Pressure (psia) | | | |
|---|---|---|---|---|---|---|---|---|---|
| | 10° C. | 25° C. | 50° C. | Comments | | 10° C. | 25° C. | 50° C. | Comments |
| 4.4 | 15 | 15 | 15 | | 5.8 | 15 | 15 | 23 | |
| 10.9 | 15 | 17 | 34 | | 8.1 | 22 | 24 | 36 | |
| 15.6 | 19 | 22 | 49 | | 14.9 | 38 | 43 | 72 | |
| 20.3 | 23 | 35 | 64 | | 21.9 | 43 | 64 | 103 | |
| 25.5 | 26 | 41 | 77 | | 25.3 | 46 | 72 | 105 | 2 phases @ 50° C. |
| 30.0 | 29 | 47 | 79 | | 33.3 | 52 | 83 | 115 | 2 phases @ all temperatures |
| 35.4 | 33 | 54 | 85 | | 40.3 | 58 | 90 | 119 | 2 phases @ all temperatures |
| 40.1 | 34 | 60 | 85 | | 47.7 | 60 | 94 | 147 | 2 phases @ all temperatures |

TABLE X

Polyol D (sucrose amine polyether)

| wt. % HFC-134 | Saturated Vapor Pressure (psia) | | | Comments | wt. % HFC-134a | Saturated Vapor Pressure (psia) | | | Comments |
|---|---|---|---|---|---|---|---|---|---|
| | 10° C. | 25° C. | 50° C. | | | 10° C. | 25° C. | 50° C. | |
| 10.6 | 23 | 31 | 38 | | 11.1 | 35 | 37 | 52 | |
| 14.9 | 23 | 26 | 42 | | 12.4 | 37 | 38 | 56 | |
| 20.4 | 21 | 31 | 60 | | 22.6 | 42 | 46 | 103 | |
| 25.4 | 24 | 38 | 75 | | 23.9 | 42 | 61 | 105 | |
| 30.1 | 28 | 45 | 82 | | 28.4 | 46 | 68 | 114 | 2 phases @ 50° C. |
| 35.3 | 31 | 53 | 84 | | 34.2 | 51 | 80 | 115 | 2 phases @ all temperatures |
| 40.1 | 34 | 55 | 85 | | 42.0 | 57 | 88 | 122 | 2 phases @ all temperatures |

TABLE XI

Polyol D (aromatic amine polyether)

| wt. % HFC-134 | Saturated Vapor Pressure (psia) | | | Comments | wt. % HFC-134a | Saturated Vapor Pressure (psia) | | | Comments |
|---|---|---|---|---|---|---|---|---|---|
| | 10° C. | 25° C. | 50° C. | | | 10° C. | 25° C. | 50° C. | |
| 5.5 | 34 | 52 | 53 | | 7.6 | 31 | 29 | 32 | 2 phases @ all temperatures |
| 10.0 | 34 | 54 | 60 | | 11.4 | 56 | 93 | 110 | 2 phases 8 all temperatures |
| 14.7 | 42 | 63 | 75 | | 12.1 | 56 | 87 | 102 | 2 phases @ all temperatures |
| 20.0 | 40 | 60 | 86 | | 18.4 | 53 | 93 | 111 | 2 phases @ all temperatures |
| 25.0 | 37 | 59 | 88 | | | | | | |
| 30.1 | 39 | 67 | 89 | | | | | | |
| 35.0 | 40 | 67 | 90 | | | | | | |
| 40.0 | 39 | 71 | 88 | | | | | | 2 phases @ 50° C. |

TABLE XIIA

Polyol D (phthalic anhydride polyether)

| wt. % HFC-134 | Saturated Vapor Pressure (psia) | | | Comments | wt. % HFC-134a | Saturated Vapor Pressure (psia) | | | Comments |
|---|---|---|---|---|---|---|---|---|---|
| | 10° C. | 25° C. | 50° C. | | | 10° C. | 25° C. | 50° C. | |
| 5.2 | 19 | 18 | 26 | | 2.7 | 21 | 21 | 22 | |
| 10.4 | 23 | 24 | 51 | | 14.0 | 38 | 71 | 101 | 2 phases @ 25 & 50° C. |
| 15.1 | 27 | 36 | 70 | | 21.4 | 58 | 98 | 118 | 2 phases @ all temperatures |
| 19.9 | 29 | 47 | 84 | | 25.4 | 61 | 95 | 123 | 2 phases @ all temperatures |
| 25.2 | 33 | 54 | 95 | | 32.6 | 58 | 94 | 152 | 2 phases @ all temperatures |
| 30.2 | 35 | 60 | 87 | | 40.4 | 74 | 108 | 176 | 2 phases @ all temperatures |
| 35.2 | 39 | 64 | 91 | | | | | | |
| 40.1 | 40 | 62 | 97 | | | | | | |

TABLE XIIB

Polyol G (PET polyether)

| wt. % HFC-134 | Saturated Vapor Pressure (psia) | | | | wt. % HFC-134a | Saturated Vapor Pressure (psia) | | | |
|---|---|---|---|---|---|---|---|---|---|
| | 10° C. | 25° C. | 50° C. | Comments | | 10° C. | 25° C. | 50° C. | Comments |
| 4.8 | 26 | 26 | 27 | | 8.1 | 50 | 51 | 55 | |
| 10.6 | 19 | 22 | 47 | | 13.0 | 55 | 70 | 89 | 2 phases @ 10 & 25° C. |
| 15.2 | 28 | 31 | 65 | | 20.2 | 59 | 94 | 100 | 2 phases @ 10 & 25° C. |
| 20.3 | 27 | 41 | 81 | | 26.8 | 60 | 96 | 136 | 2 phases @ all temperatures |
| 24.8 | 34 | 50 | 94 | | 34.1 | 57 | 90 | 123 | 2 phases @ all temperatures |
| 30.3 | 33 | 58 | 90 | | 37.4 | 57 | 90 | 152 | 2 phases @ all temperatures |
| 35.0 | 37 | 62 | 95 | | | | | | |
| 40.1 | 38 | 65 | 96 | | | | | | |

Example 12

The following example illustrates use of HFC-134 to produce a typical rigid pour-in-place insulation foam. These foams were produced on a Gusmer Delta Rein 40, at a foam throughput of 20.21 lbs/minute and component fed temperatures at 21–27° C. The low vapor pressure of the B-side composition employing HFC-134 allowed preparation of this foam in conventional apparatus.

FOAM FORMULATION

| Component | Parts by Weight | |
|---|---|---|
| MDI Isocyanate[1] | 150 | 150 |
| Polyether Polyol Blend[2] (including silicone surfactant and catalyst) | 100 | 100 |
| HFC-134 Blowing Agent | 19.6 | — |
| HFC-134a Blowing Agent | — | 18.1 |
| Properties | | |
| Isocyanate Index (x100) | 130 | 130 |
| B-side System Vapor Pressure (PSIG) | 0[3] | 25 |
| Foam Density (Lbs/Ft$^3$) | 1.8–1.9 | 1.8–1.9 |
| Thermal Conductivity (BTU · in/ft$^2$ · hr · ° F.) | 0.156–0.165 | 0.160–0.164 |
| Cell Structure | fine & uniform | fine, slight pinholes, occasional void |

1-Low viscosity polymeric methylene diphenyl diisocyanate with an equivalent weight of 136.
2-Sucrose-based polyether polyol with a hydroxyl value in the 325–350 range.
3-As typical in conventional foam apparatus, a slight nitrogen pressure was used to feed the metering pumps.

Having thus described and exemplified the invention with a certain degree of specificity, it should be appreciated that the following claims are not to be so limited but are to be afforded a scope commensurate with the wording of each element of the claims and equivalents thereof.

What is claimed is:

1. A homogeneous B-side composition for the preparation of polyisocyanate-based polymer foams, comprising a) a liquid active hydrogen-containing component having at least one polyol selected from the group consisting of polyether polyols, polyester polyols, and polyhydroxy-terminated acetal resins;

b) a gaseous blowing agent comprising 1,1,2,2-tetrafluoroethane (HFC-134) dissolved in said active hydrogen-containing component, wherein
   said B-side composition comprises a homogeneous solution comprising 2.1–40.2 weight percent of said blowing agent dissolved in said active hydrogen-containing component, said solution having a saturated vapor pressure of 15–97 psia at a temperature of 10° C.–50° C.

2. A homogeneous B-side composition as in claim 1 wherein said active hydrogen-containing component is a blended polyether polyol, said composition comprising 2.1–40.17 weight percent HFC-134 and said saturated vapor pressure is 15–79 psia at a temperature of 10° C.–50° C.

3. A homogeneous B-side composition as in claim 1 wherein said active hydrogen-containing component is a propylene oxide polyether polyol, said composition comprising 5.7–40.2 weight percent HFC-134 and said saturated vapor pressure is 15–60 psia at a temperature of 10° C.–50° C.

4. A homogeneous B-side composition as in claim 1 wherein said active hydrogen-containing component is a sucrose polyether polyol, said composition comprising 4.4–40.1 weight percent HFC-134 and said saturated vapor pressure is 15–85 psia at a temperature of 10° C.–50° C.

5. A homogeneous B-side composition as in claim 1 wherein said active hydrogen-containing component is a sucrose amine polyether polyol, said composition comprising 10.6–40.1 weight percent HFC-134 and said saturated vapor pressure is 23–85 psia at a temperature of 10° C.–50° C.

6. A homogeneous B-side composition as in claim 1 wherein said active hydrogen-containing component is an aromatic amine polyether blend, said composition comprising 5.5–40 weight percent HFC-134 and said saturated vapor pressure is 34–88 psia at a temperature of 10° C.–50° C.

7. A homogeneous B-side composition as in claim 1 wherein said active hydrogen-containing component is a phthalic anhydride polyether polyol, said composition comprising 5.2–40.1 weight percent HFC-134 and said saturated vapor pressure is 18–97 psia at a temperature of 10° C.–50° C.

8. A homogeneous B-side composition as in claim 1 wherein said active hydrogen-containing component is a polyethylene terephthalate polyester polyol, said composition comprising 4.8–40.1 weight percent HFC-134 and said saturated vapor pressure is 26–96 psia at a temperature of 10° C.–50° C.

* * * * *